Aug. 16, 1960 P. GINDES ET AL 2,949,026
ACCELEROMETER WITH BUILT-IN PRECHECK MEANS
Filed April 21, 1958 3 Sheets-Sheet 1

INVENTORS:
Philip Gindes
Arthur C. Hughes, Jr.

By Smyth & Roston
Attorneys

INVENTORS:
Philip Gindes
Arthur C. Hughes, Jr.

By Smyth & Roston
Attorneys

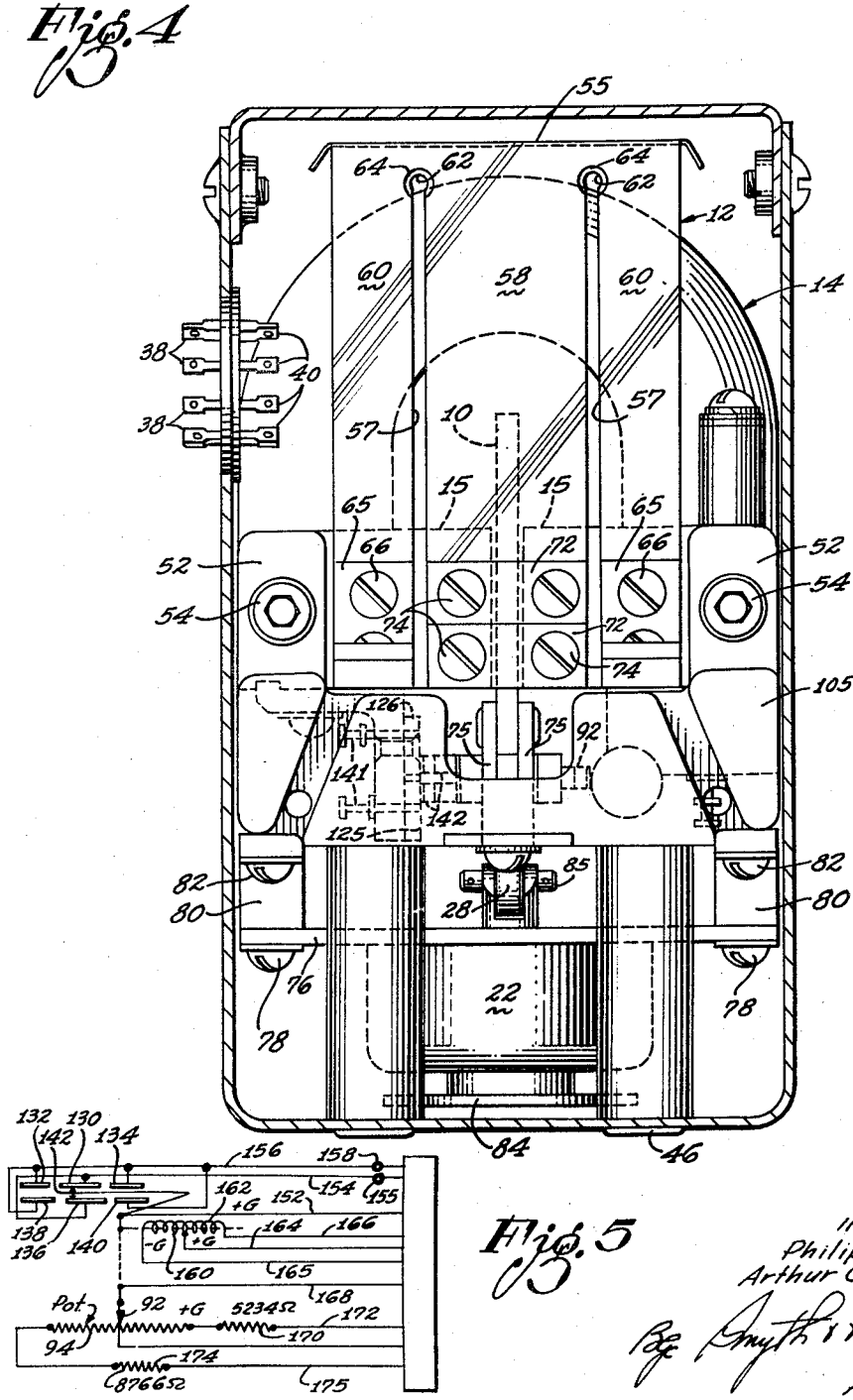

United States Patent Office

2,949,026
Patented Aug. 16, 1960

2,949,026

ACCELEROMETER WITH BUILT-IN PRECHECK MEANS

Philip Gindes, Los Angeles, and Arthur C. Hughes, Jr., Pacific Palisades, Calif., assignors to Genisco, Inc., Los Angeles, Calif., a corporation Filed Apr. 21, 1958, Ser. No. 729,754

8 Claims. (Cl. 73—1)

This invention relates to accelerometers to be used for example, to sense the accelerations of an aircraft, missile, rocket or the like. The particular type of accelerometer to which the invention pertains has a sensing mass that is yieldingly mounted to move along a sensing axis in opposite directions from a normal null position and suitable means is provided to detect and/or measure the movements of the sensing mass.

The invention concerns the incorporation in the construction of such an accelerometer of suitable means for testing the operating state of the accelerometer. Such built-in testing means makes it possible to check the operativeness of the accelerometer whenever desired. A prior art arrangement for this purpose consists of a pair of solenoids for selective energization to force the sensing mass in the two opposite directions selectively, the strokes of the solenoid armatures being in the same direction as the sensing axis of the accelerometer.

The problem to which the invention is primarily directed is to incorporate such a precheck means in an accelerometer of this type without unduly increasing the dimensions of the accelerometer. In many installations compactness of the accelerometer configuration is of great importance.

One reason for the above described prior art arrangement being unduly bulky is that the longest dimension of an accelerometer is usually along its sensing axis and with the two precheck solenoids oriented in the same direction at the two ends of the sensing axis, the solenoids add greatly to the length of the accelerometer to make the length excessive. Another reason for the excessive length is that each solenoid must be dimensioned to deliver a relatively long stroke since an adequate precheck requires that each solenoid be capable of moving the sensing mass from its normal central null position to a limit position at one end of the sensing axis.

A still further reason for excessive elongation of the accelerometer arises when the sensing axis is substantially vertical. In such an instance, the weight of the sensing mass causes the sensing mass to seek a null position that is off-center with respect to the range of movement of the sensing mass, the displacement from the usual central position being equivalent to one G of acceleration. Accordingly, one of the two solenoids must be dimensioned to deliver a correspondingly longer stroke to shift the sensing mass past center to the opposite limit position.

The present invention avoids all of these difficulties and solves the problem of achieving compactness in the accelerometer configuration. This end is accomplished by orienting the two solenoids transversely of the sensing axis, instead of longitudinally of the sensing axis, and by further providing a cam arrangement whereby a relatively large shift of the sensing mass along the sensing axis may be accomplished by a relatively short solenoid stroke. In the preferred practice of the invention the sensing mass is provided with two oppositely inclined cam surfaces on one of its longitudinal sides, and the armatures of the two lateral solenoids are equipped with roller-type followers to act against these cam surfaces.

Preferably, the precheck arrangement includes suitable indicating means responsive to the shift of the sensing mass. Such an indicating means may comprise a set of contacts extending parallel to the sensing axis in combination with a brush or wiper means carried by the sensing mass to move along the plurality of contacts. Thus, energization of a central contact of the set indicates that the sensing mass is in a central position and energization of either of two opposite end contacts of the set indicates that the sensing mass is at one of its extreme positions along the sensing axis. In this regard, a feature of the preferred practice of the invention is the concept of using two similar and substantially coextensive sets of contacts with the two sets wired in parallel to cooperate with the brush or wiper means. At least one of the two sets of contacts is adjustable longitudinally relative to the other.

Since the two individual sets are wired in parallel, the two sets of contacts may be termed a composite set. Shifting one individual set relative to the other individual set, in effect, changes the dimensions of the composite set. Thus, the effective over-all length of the two central parallel contacts may be changed by adjustment of one of the sets relative to the other, the gaps between the central pair of contacts and the two opposite end pairs of contacts being varied by the same adjustment.

The features and advantages of the invention may be understood from the following detailed description together with the accompanying drawings.

In the drawings, which are to be regarded as merely illustrative:

Fig. 4 is an end elevation of the accelerometer with the accelerometer housing shown in section; and Fig. 5 is a wiring diagram of the circuits incorporated in the accelerometer.

Figure 1:
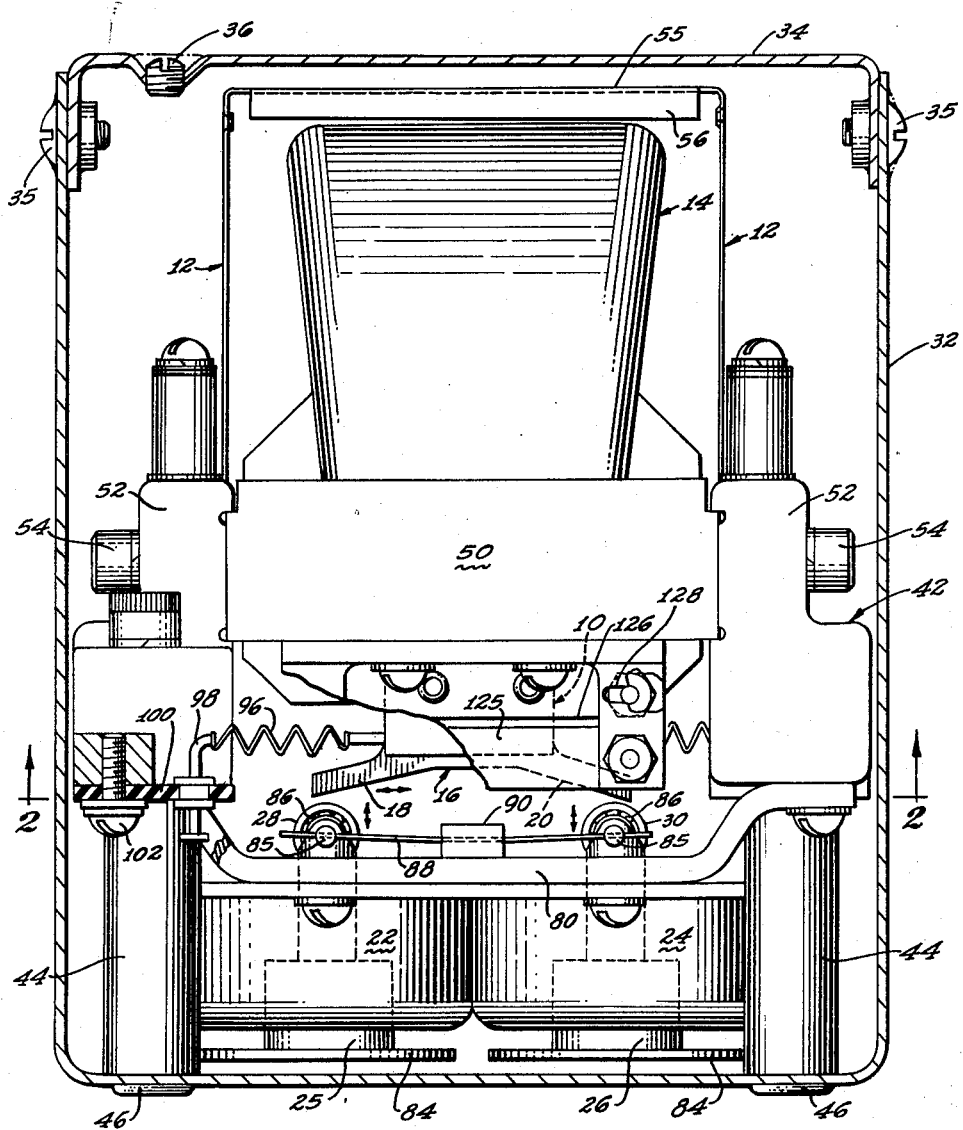
Fig. 1 is a side elevational view of an accelerometer embodying a selected practice of the invention, portions of the accelerometer being broken away and the accelerometer housing being shown in section.

The principal parts of the selected embodiment of the accelerometer include: a sensing mass 10 in the form of a thin plate of non-magnetic material positioned in a vertical plane; a pair of E springs, generally designated 12, resiliently supporting the opposite ends of the sensing mass; a U-shaped permanent magnet, generally designated 14, having a pair of pole pieces 15 that straddle the sensing mass 10 to damp the movements of the sensing mass by magnetic hysteresis; a cam means, generally designated 16, on the underside of the sensing mass 10, which cam means has two oppositely inclined cam portions 18 and 20; and a pair of solenoids 22 and 24 having two corresponding armatures 25 and 26 carrying corresponding roller-type follower members 28 and 30 to cooperate with the cam portions 18 and 20 respectively.

The moving parts of the accelerometer are enclosed in a fluid-tight manner by a box-like housing 32 which is filled with a damping liquid such as a suitable oil. The housing 32 includes a cover 34 that is secured by suitable screws 35 and is made fluid-tight by soldering. The cover has a fill opening that is normally closed by a screw-type plug 36 (Fig. 1). The housing 32 has a plurality of external terminal members 38 and a corresponding plurality of internal terminal members 40 for use to connect the electrical components of the accelerometer to external circuitry.

The support structure inside the housing 32 includes a rectangular support frame, generally designated 42, which is mounted on four cylindrical support bodies or legs 44. Each of the cylindrical support bodies 44 has a reduced upper end 45 (Fig. 2) which is screw-threaded into the rectangular support frame 42. Each of the cylindrical support bodies 44 is also reduced in diameter at its lower end to fit into a corresponding circular aperture in the bottom wall of the housing 32, and the exposed lower end of the support body is peened over to form an anchoring flange 46 for positive engagement with the bottom wall of the housing. These joints between the four cylindrical support bodies 44 and the bottom wall of the housing are sealed by a suitable bonding material such as solder or brazing material.

The ends of the rectangular support frame 42 comprise a pair of end castings 48, each of which is connected at its opposite ends to a pair of cylindrical support bodies 44. The two opposite longitudinal sides of the rectangular support frame 42 comprise a pair of blocks 50 of brass or other non-magnetic material, the previously mentioned pole pieces 15 being attached to the inner sides of the blocks. The two end castings 48 have upwardly extending integral lugs 52 at their opposite ends (Figs. 1 and 4) and the blocks 50 are joined to these lugs by suitable screws 54, as best shown in Fig. 1.

As best shown in Fig. 1, each of the two E springs 12 is a vertical end portion of a sheet of flexible material such as Phosphor bronze or beryllium bronze, the two E springs being interconnected by a web 55 of the sheet material that is stiffened by longitudinal side flanges 56. Each of the vertical end portions of the resilient sheet material is formed with a pair of vertical slots 57 which form a middle spring element or leg 58 and two flanking spring elements or legs 60. Preferably, the middle spring leg 58 is approximately twice the width of the individual flanking legs 60. Preferably, the vertical slots 57 are formed with circular enlargements 62 at their inner ends and these enlargements are dimpled, i.e. subjected to a punch press operation to form a frusto-conical flange 64 around the circular enlargements.

The ends of the four narrower legs 60 of the two E springs 12 are fixedly attached to opposite ends of the previously mentioned rectangular support frame 42. As best shown in Fig. 4, the spring legs 60 may be attached to the rectangular support frame 42 by suitable clamp plates 65 and screws 66 that extend through the clamp plates into the support frame.

Figure 2:
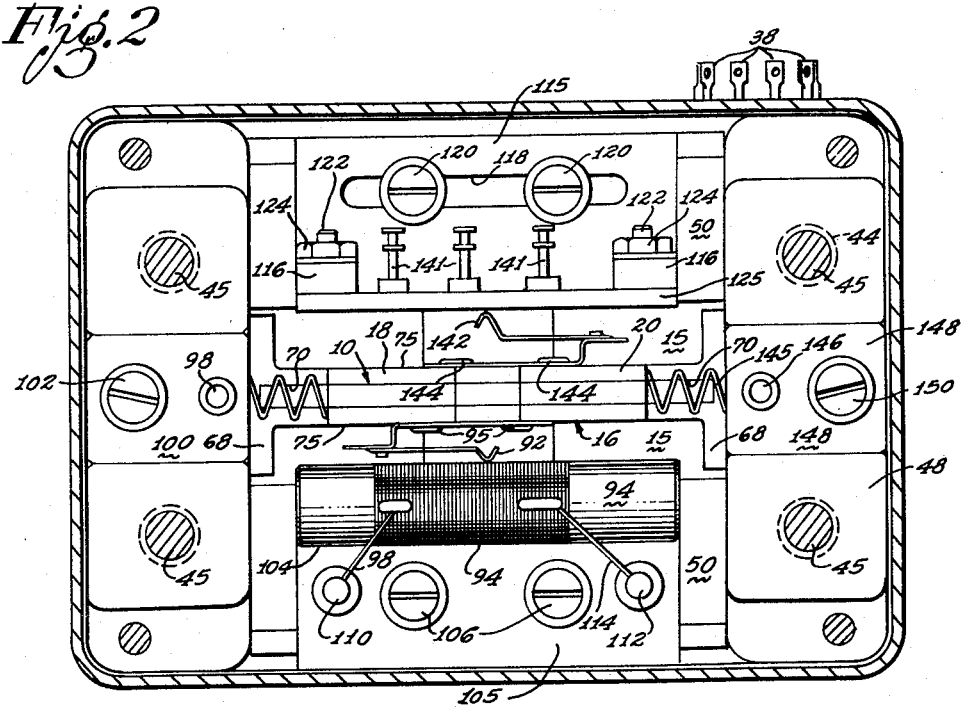
Fig. 2 is a bottom view of portions of the accelerometer as seen along the line 2—2 of Fig. 1, the accelerometer housing being shown in section.
Figure 3:
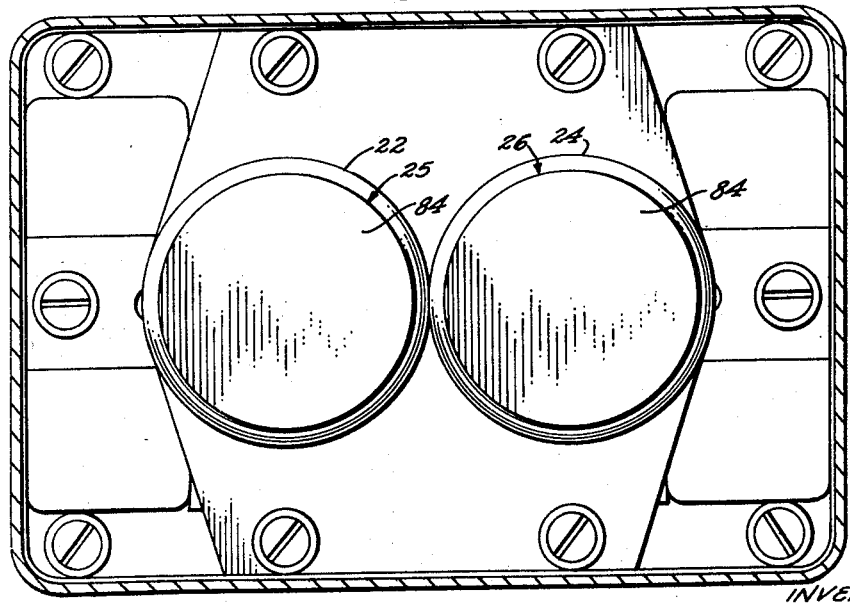
Fig. 3 is a bottom view of the accelerometer with the accelerometer housing shown in section.

As indicated in Fig. 2, each of the two opposite ends of the sensing mass 10 is rigidly connected to a corresponding T-block 68, each of the T-blocks being formed with a slot 70 that straddles the ends of the sensing mass. As shown in Fig. 4, each of the T-blocks 68 is connected to the middle leg 58 of the corresponding E spring 12 by means of a pair of clamp plates 72 and suitable screws 74, the pair of clamp plates being positioned side by side.

The cam means 16 for cooperation with the two solenoids 22 and 24 is provided by forming a lower edge of the sensing mass 10 to the desired cam configuration and by adding a correspondingly shaped pair of plates 75 (Figs. 2 and 4) on the opposite sides of the sensing mass to provide the desired thickness for the cam means. The two followers 28 and 30 of the two solenoids are placed near the opposite ends of the cam means 16 at the normal position of the sensing mass 10.

The two solenoids 22 and 24 are mounted on the underside of a transverse support plate 76 which is secured at its opposite ends by suitable screws 78 to the undersides of a pair of shallow U-shaped brackets 80. The brackets 80, in turn, are attached by screws 82 to recessed portions of the restangular support frame 42 on the underside of the frame.

The two armatures 25 and 26 of the two solenoids are formed with disks 84 of magnetic material at their lower ends and are reduced in diameter to extend upward through the corresponding solenoid coils and through the support plate 76. As best shown in Fig. 4, the upper ends of the two armatures 25 and 26 are slotted to forked configuration to receive transverse axle pins 85 on which the follower rollers 28 and 30 are mounted by ball bearings 86.

Any suitable yielding means may be provided to retain the two armatures 25 and 26 at their retracted positions when the solenoids are de-energized. In this instance, a leaf spring 88 is employed in the manner shown in Fig. 1, the leaf spring being centrally mounted on a support block 90 with the two ends of the leaf spring straddling the upper ends of the armatures in engagement with the axle pins 85.

In the normal operation of the accelerometer apart from the precheck procedure, the movements of the sensing mass 10 along the sensing axis are detected by means of a brush or wiper 92 that is carried by the sensing mass in contact with a potentiometer coil 94. The wiper 92 is mounted on one side of the sensing mass 10 by suitable fastening elements 95 and is connected to the required circuitry by a fine and exceedingly flexible wire 96. As shown in Fig. 1, the flexible wire 96 is connected to a terminal fitting 98 that is mounted on a small plate 100 of non-conducting material. The plate 100 is connected by a screw 102 to the underside of the rectangular support frame 42.

The potentiometer coil 94 is wound on a cylindrical core 104 which is united with a support member 105, the support member being secured to the underside of the rectangular support frame 42 by suitable screws 106. One end of the potentiometer coil 94 is connected by a wire 98 to a terminal fitting 110 on the support member 105, and the other end of the potentiometer coil is connected in similar manner to a second terminal fitting 112 by a wire 114.

For the purpose of the precheck procedure in the preferred practice of the invention, a second arrangement is provided on the other side of the sensing mass 10 to detect the response of the sensing mass to selective energization of the two solenoids 22 and 24. For this purpose, an angular support in the form of a plate 115 with two spaced downwardly extending arms 116 is mounted on the underside of the rectangular support frame 42 in an adjustable manner. As shown in Fig. 2, the plate 115 may be formed with a longitudinal slot 118 to receive two mounting screws 120 which may be temporarily loosened for adjustment. Mounted on the two arms 116 by screws 122 and nuts 124 is a fixed strip 125 and an adjacent adjustable strip 126, both strips being made of non-conducting material. The strip 126 is made adjustable by providing slots 128 therein to receive the corresponding screws 122.

The fixed strip 125 carries a set of three aligned contacts that are shown diagrammatically in Fig. 5, namely a central contact 130 and two end contacts 132 and 134. In like manner, the adjustable strip 126 carries a similar series of contacts comprising a central contact 136 and two end contacts 138 and 140. These six contacts are provided with corresponding terminal fittings 141 for connection to electric circuitry. For cooperation with the two sets of contacts, a corresponding pair of brushes or wipers 142 are mounted side by side on the sensing mass 10 by suitable fastening elements 144. The two wipers 142 are electrically interconnected and both are connected to the required circuitry by a fine and exceedingly flexible wire 145. The flexible wire 145 extends to a terminal fitting 146 on a small plate 148 of non-conducting material that is secured in the underside of the rectangular support frame 42 by suitable screws 150.

The circuitry associated with the described accelerometer may be uderstood by reference to Fig. 5. The two wipers 142 that traverse the two sets of contacts are energized by a wire 152. The two central contacts 130 and 136 of the two sets are connected to a return wire 154 which may energize a signal lamp 155. The four end contacts 132, 134, 138 and 140 of the two sets are connected to a second return wire 156 which may energize a second signal lamp 158.

The coils 160 and 162 of the respective solenoids 22 and 24 are connected to a common wire 164. The second side of the solenoid coil 160 is connected to a wire 165 that leads to a remote control switch (not shown) and the second side of solenoid coil 162 is connected to a wire 166 that leads to a second remote switch (not shown). The wiper 92 that traverses the potentiometer coil 94 is energized by a wire 168. One end of the potentiometer coil 94 is connected through a resistor 170 with a return wire 172 and the other end of the potentiometer coil is connected through a resistor 174 to a second return wire 175.

The manner in which the precheck arrangement functions for its purpose may be readily understood from the foregoig description. In a typical precheck procedure, the operator first energizes the solenoid coil 160 by closing the switch associated with the wire 165. Energization of the solenoid 22 causes the follower roller 28 to move against the cam means 16 to cause the sensing mass 10 to shift to the left was viewed in Fig. 1. Before the solenoid 22 is energized, the sensing mass 10 is at its normal central null position with the two wipers 142 at the central pair of contacts 130 and 136 to energize the signal lamp 155. The leftward shift of the sensing mass 10 caused by energization of the solenoid 22 moves the pair of wipers 142 to the pair of end contacts 132 and 138, and the consequent de-energization of the lamp 155 and energization of the lamp 158 informs the operator that the sensing mass has responded to the solenoid. The operator then de-energizes the solenoid 22 to permit the sensing mass 10 to return to its central position, which action is indicated by de-energization of the lamp 158 and energization of the lamp 155.

The operator then energizes the right solenoid 24 to cause the sensing mass to shift to the right and checks on this action by observing whether or not the lamp 155 is de-energized and the lamp 158 is energized. When subsequent de-energization of the right solenoid 24 results in the signal lamp 155 being again energized to signal the return of the sensing mass to its normal position, the precheck is completed to indicate that the solenoid is in working order.

The two sets of contacts may be adjusted relative to each other by shifting the adjustable strip 126 carrying the central contact 136 and the two opposite end contacts 138 and 140. Shifting of this strip in either direction, in effect, elongates the central pair of cooperating contacts 130 and 136 in the same direction with consequent narrowing of the gaps between the central pair of contacts and the opposite end pairs of contacts.

Our description in specific detail of the selected embodiment of the invention will suggest various changes, substitutions and other departures from our disclosure within the spirit and scope of the appended claims.

We claim:
1. In an accelerometer having a sensing mass yieldingly movable along a sensing axis from a normal null position, together with means responsive to the movement of the sensing mass, precheck means to shift the sensing mass to test the operating condition of the accelerometer, said precheck means comprising: cam means carried by the sensing mass and presenting a cam surface on one longitudinal side of the sensing mass; follower means adjacent said cam means and movable against the cam means in a direction transverse of said sensing axis; and remotely controlled means to actuate said follower means to cause the sensing mass to shift along its axis.

2. A combination as set forth in claim 1 in which said remotely controlled means is a solenoid means.

3. A combination as set forth in claim 1 in which said follower means comprises a roller freely rotatable on its axis.

4. In an accelerometer having a sensing mass yieldingly movable along a sensing axis in opposite directions from a normal null position, together with indicating means responsive to movements of the sensing mass, precheck means to shift the sensing mass to test the operating condition of the accelerometer, said precheck means comprising: cam means carried by the sensing mass and presenting two oppositely inclined cam surfaces along one longitudinal side of the sensing mass; two follower means adjacent said sensing mass and movable transversely of said axis against said two cam surfaces, respectively, to cause the sensing mass to shift in opposite directions along its sensing axis; and romately controlled means to actuate said two follower means selectively.

5. A combination as set forth in claim 4 in which said remotely controlled means comprises two solenoids operatively connected to said two follower means respectively.

6. A combination as set forth in claim 5 in which said two cam surfaces are inclined towards each other whereby actuation of each following means shifts the central portion of the sensing mass towards the following means.

7. A combination as set forth in claim 4 in which said sensing means includes: a first set of contacts arranged in sequence; a second similar set of contacts arranged in sequence and approximately coextensive with the first set; wiper means operatively connected to said sensing mass and movable between said two sets of contacts in cooperation with both sets, at least one of said sets of contacts being adjustable longitudinally to shift as a whole; and an indicating circuitry connected to said wiper means and said two sets of contacts, said two sets of contacts being connected in parallel.

8. A combination as set forth in claim 7 in which each of said two sets of contacts comprises a central contact and two opposite end contacts; and in which one circuit of the indicating circuitry is connected with said central contacts of the two sets of contacts and a second circuit of the indicating circuitry is connected to the end contacts of the two sets.

References Cited in the file of this patent

UNITED STATES PATENTS

| 1,332,810 | Danielson | Mar. 20, 1920 |
| 2,052,205 | Baughman | Aug. 25, 1936 |
| 2,640,900 | Klose | June 2, 1953 |